Oct. 21, 1969     T. DZUS ET AL     3,473,203

FASTENER STUD ASSEMBLY

Filed Jan. 31, 1968

INVENTOR
THEODORE DZUS
CONRAD J GUNTHER
BY
Kane, Dalsimer, Kane, Sullivan & Smith
ATTORNEYS United States Patent Office 3,473,203
Patented Oct. 21, 1969

3,473,203
FASTENER STUD ASSEMBLY
Theodore Dzus, West Islip, and Conrad J. Gunther, Uniondale, N.Y., assignors to Dzus Fastener Co. Inc., West Islip, N.Y., a corporation of New York
Filed Jan. 31, 1968, Ser. No. 701,907
Int. Cl. F16b 21/04
U.S. Cl. 24—221     2 Claims

ABSTRACT OF THE DISCLOSURE

A fastener stud assembly comprising as having inner and outer ends each formed with inwardly extending parts defining openings. The head of a stud is confined within the cup in that its diameter is greater than those openings. The stud stem extends from within the cup through the opening in its inner end. The stem part within the cup is encircled by a spring, bearing at one end against the stud head and at its opposite end thrusting against the part at the inner cup ends; the stem projecting beyond that end. A cam slot is present in such projecting part of the stem. A mounting flange is included in the cup and projects axially thereof beyond the extended part at its inner end. A washer slidably encircles the stem and is disposed between the inner spring end and the adjacent inwardly extending cup part, a projecting portion moving with the stem and engaging with the washer.

BACKGROUND OF THE INVENTION

In fasteners of the type shown in U.S. patent to Dzus 2,580,666, of Jan. 1, 1952, difficulties have in certain instances been experienced in connection with the mounting of the fastener stud assembly where the several parts thereof have been operatively combined prior to effecting a rigid, aligned and permanent connection between the assembly and the mounting therefor; that connection being achieved by the employment of a flaring tool in cooperation with a bucking tool.

SUMMARY OF THE INVENTION

This problem is overcome by the present structure in which a bucking tool serves to retract the head of the stud within the cup and exert a proper pressure between the faces of the shoulder at the cup end and the mounting panel, to therefor assure proper positioning of the cup mounting flange in relation to the opening receiving it. For this purpose continuing and adequate pressure is maintained during the cooperation of a flaring tool with the mounting flange to rigidly lock the latter to the panel. To achieve this a projecting portion moves with the stud shank and engages with a washer resting upon the cup shoulder to transmit the full thrust of the bucking tool.

BRIEF DESCRIPTION OF THE DRAWING

In the drawings, which show a preferred form of the invention.

BRIEF DESCRIPTION OF THE PREFERRED EMBODIMENT

Figure 2:
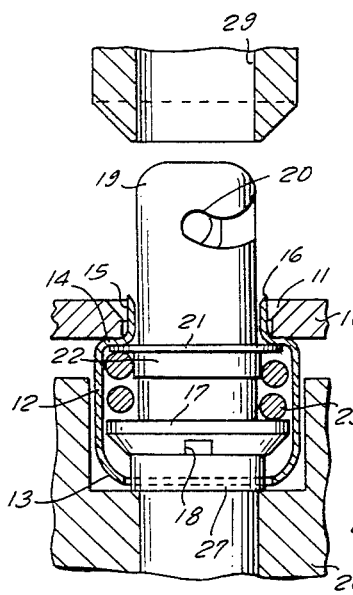
FIGURE 2 is an enlarged sectional side view of the assembly, with a disposition of the parts, such as would occur immediately prior to the mounting operation.

Referring primarily to FIGURE 2 it will be seen that the numeral 10 identifies the panel, or support formed with an opening which adjacent its base is flared, as at 11. The fastener unit embraces a cup 12, the outer end of which is constricted as at 13, to define an opening of limited area. At its opposite end the cup is also formed with an inwardly extending part in the form of a shoulder 14 lying in a plane at right angles to the cup axis. Beyond this the lower cup end terminates in a mounting flange 15 having an undercut, inner end face 16.

The stud includes a head, grooved as at 18 to receive the end of a screwdriver. The stud shank 19 is preferably hollow and formed with spiral cam slots. A washer slidably encircles the shank. The latter has an outwardly extending support adjacent the washer, preferably in the form of an annular rib 22. A coil spring 23 is interposed between the washer 21 and the head 17.

These elements are disposed in proper relationship prior to constricting, or forming the inwardly extending end part 13 of the cup. Thus, the stud shank is introduced through the spring coils to a position where the end of the latter bears against head 17. Thereupon washer 21 is likewise mounted on the shank to bear against the inner spring end and lie adjacent the rib or projection 22. With the outer cup end open to define a space greater than the area of head 17, the shank and the parts mounted thereon, are introduced through that end to a point where washer 21 rests against shoulder 14. Thereupon, the outer end of the cup is constricted to form the inwardly extending part 13, with the several elements mounted by the stud shank confined within the cup.

Figure 1:
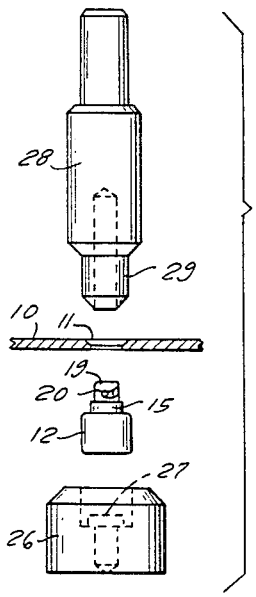
FIGURE 1 is a somewhat schematic view of a panel, fastener unit and a grouping of tools suitable for fixedly securing the unit to the panel.
Figure 5:
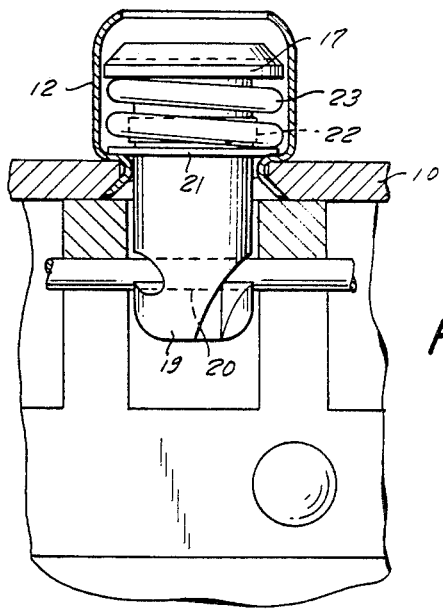
FIGURE 5 shows the unit in section, but with its outer end uppermost and with the rod or wire thereof engaged by the shank spiral slots of the stud.
Figure 3:
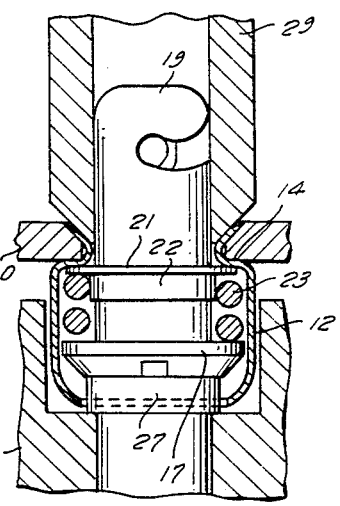
FIGURE 3 is a similar view, but showing the assembly immediately following the completion of this operation.
Figure 4:
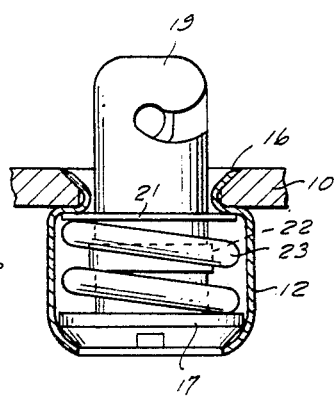
FIGURE 4 is a similar view with the tools removed.

Therefore it is apparent that a completely preassembled fastener stud grouping is present prior to the mounting of the latter. The assembly may now be locked to a mounting as illustrated in FIGURES 1, 2 and 3. In those views the numeral 26 indicates a bucking tool which includes an anvil portion 27. The area of the latter is such that it may readily pass through the opening bounded by the end part 13 of the cup. The shoulder 14 of the cup is brought to bear firmly in contact with the panel face, with the inner stud end projecting through the panel opening and flange 15 also extending therethrough, as in FIGURE 2.

This condition is continued while a flaring tool anchors the unit against movement with respect to panel 10. Such tool—as in FIGURE 1—includes the usual body 28 with a stem 29 having a tapered end surface. That stem is hollow with a bore which will accommodate shank 19. The tapered end surface will be projected until its leading edge enters the space between the shank and the undercut surface 16 of flange 15. Under continuing pressure that flange will be flared to intimately engage surface 11 of the mounting and thus secure the unit to the latter.

Thus, the object of the invention is achieved. It is apparent that numerous changes in construction may be resorted to without departing from the scope of the invention.

Having now described the invention, we claim:

1. A fastener stud assembly unit including in combination a cup, inwardly extending parts of the cup defining openings at its inner and outer ends, an axially projecting flange forming a continuation of the extended part at the inner cup end, a stud comprising a head and a slotted shank, a spring encircling said shank, the area of said head being greater than the area of the opening defined by the part at the outer cup end, said stud being positioned with its head enclosed by said cup adjacent said latter end, the stud shank extending through the opening defined by the part at the inner cup end, one end of said spring thrusting against the stud head, the opposite spring end acting against said part of the cup at the inner end of the latter to thus cause said head to bear against the part of the cup at the outer end thereof, a washer slidably encircling said shank and interposed between said inner end part and the adjacent spring end and a projection carried by and movable with said shank to engage with said washer as the stud head is moved towards the inner cup end.

2. In a fastener as defined in claim 1, said part at the inner cup end comprising a flange projecting radially at right angles to the cup axis, the outer flange surface being engageable with the surface of a mounting for said unit and the inner flange surface being directly engaged with said washer when the stud head is pushed into said cup against the force of the spring.

References Cited

UNITED STATES PATENTS

| | | | |
|---|---|---|---|
| 2,580,666 | 1/1952 | Dzus. | |
| 2,831,520 | 4/1958 | Clarke | 24—221 |
| 3,343,581 | 9/1967 | Martin | 151—69 |

BERNARD A. GELAK, Primary Examiner

U.S. Cl. X.R.

151—69